United States Patent [19]

Deschner

[11] Patent Number: 5,244,077
[45] Date of Patent: Sep. 14, 1993

[54] TRANSPORT GEAR CHAIN ARRANGEMENT

[75] Inventor: Heinrich Deschner, Eime, Fed. Rep. of Germany

[73] Assignee: Mannesmann Aktiengesellschaft, Düsseldorf, Fed. Rep. of Germany

[21] Appl. No.: 869,768

[22] Filed: Apr. 16, 1992

[30] Foreign Application Priority Data

Apr. 16, 1991 [DE] Fed. Rep. of Germany ....... 4112741

[51] Int. Cl.$^5$ ............................................. B65G 47/31
[52] U.S. Cl. .................................. 198/461; 198/817; 198/579; 198/835
[58] Field of Search ............... 198/461, 817, 579, 575, 198/576, 835

[56] References Cited

U.S. PATENT DOCUMENTS

| 2,828,917 | 4/1958 | Wheeler et al. ................ 198/461 X |
| 2,959,271 | 11/1960 | Adamson . |
| 3,187,878 | 6/1965 | Harrison et al. ................. 198/579 X |
| 3,279,587 | 10/1966 | Gray et al. ....................... 198/817 X |
| 3,586,393 | 6/1971 | Myers . |
| 3,592,139 | 7/1971 | Patin ................................. 198/579 X |
| 4,353,459 | 10/1982 | Petershack . |
| 4,360,101 | 11/1982 | McGill et al. .................... 198/461 |

FOREIGN PATENT DOCUMENTS

| 1206799 | 12/1965 | Fed. Rep. of Germany . |
| 2346407 | 3/1974 | Fed. Rep. of Germany . |
| 3149023 | 7/1982 | Fed. Rep. of Germany . |
| 3235632 | 3/1984 | Fed. Rep. of Germany . |
| 965914 | 8/1950 | France . |
| 245639 | 12/1985 | German Democratic Rep. . |
| 773784 | 5/1957 | United Kingdom . |

OTHER PUBLICATIONS

Publication: DE-Z: "Industrie-Anzeiger"; Jan. 24, 1958; No: 7 pp. 102 and 103.

Primary Examiner—Robert P. Olszewski
Assistant Examiner—Cheryl L. Gastineau
Attorney, Agent, or Firm—Horst M. Kasper

[57] ABSTRACT

A transport gear chain arrangement, in particular for the transport of glass articles, includes two gear chain sections (2 or, respectively, 3) successively following to each other in transport direction. In each case, transport gear chains (6), surrounding and looping around two sprocket wheels (7), are guided on a chain sliding track (26). At least one sprocket wheel (7) is driven in each gear chain section (2; 3). In order to decrease or increase the distance between neighboring articles to be transported on one of the gear chain sections (2 or, respectively, 3), two gear chain sections (2, 3), disposed successively as seen in transport direction (1), are drivable with differently set or settable speeds. A first transport chain (6) of a first gear chain section (2 or, respectively, 3) is engaged with the sprocket wheel teeth (8) of a common sprocket wheel (7) and a second transport gear chain (6) of a second gear chain section (2; 3) is slidingly guided on cylindrical sections (10), disposed between individual sprocket wheel disks (9) of the common sprocket wheel (7).

22 Claims, 9 Drawing Sheets

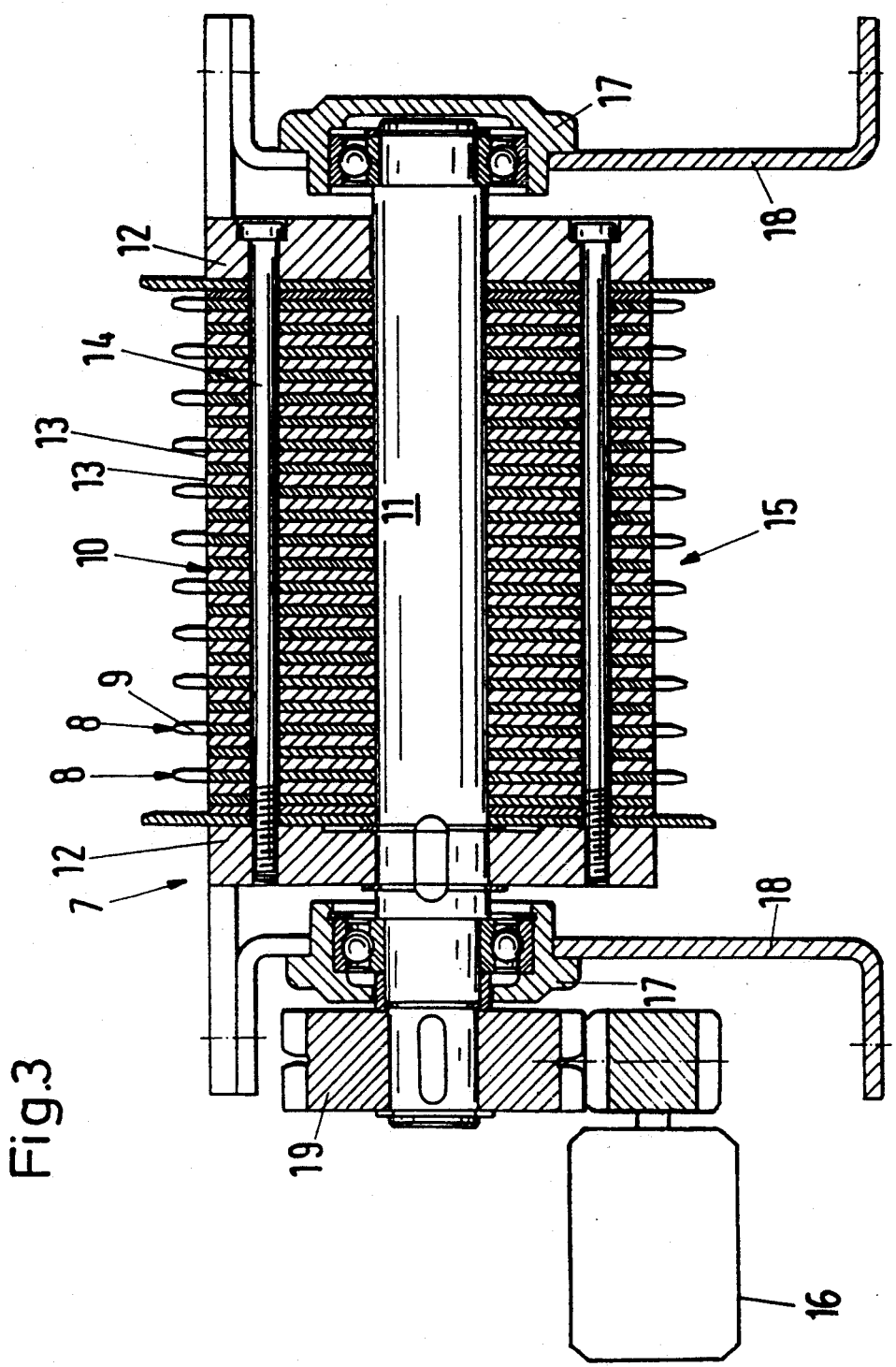

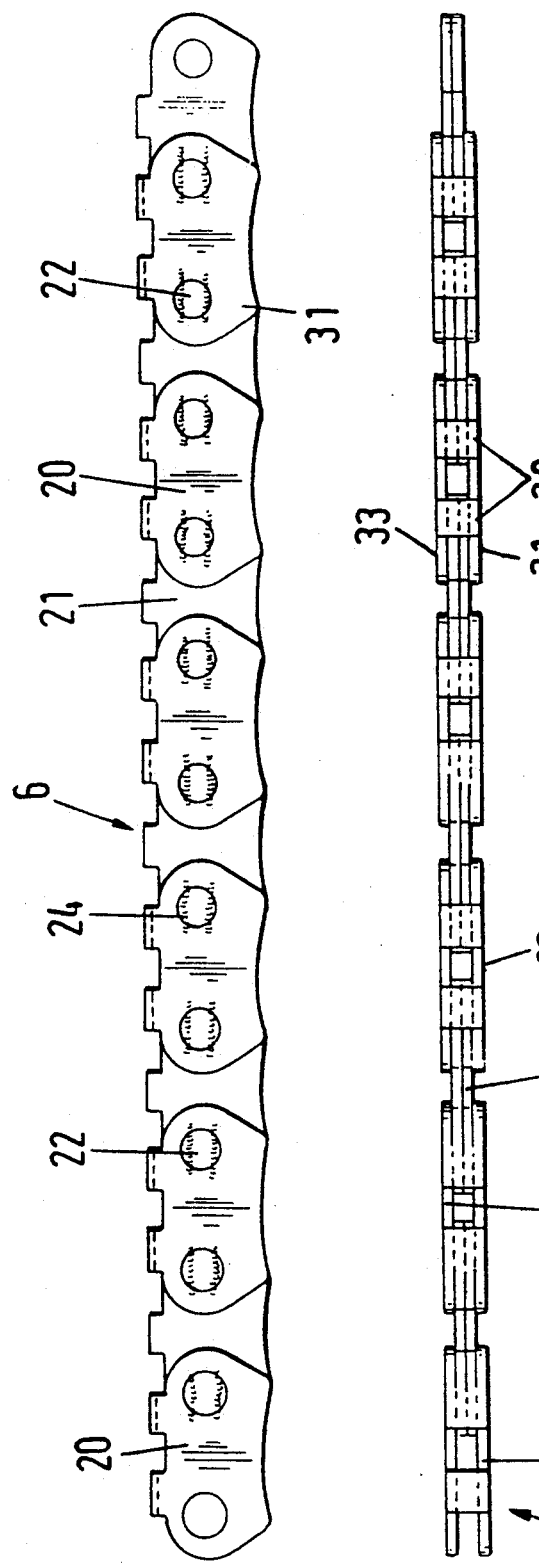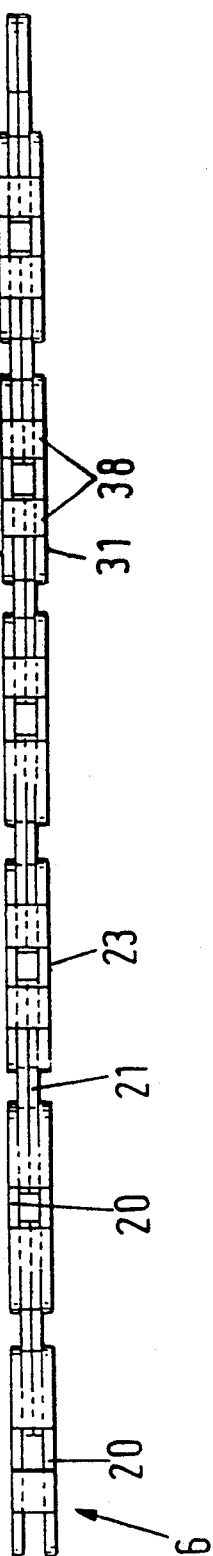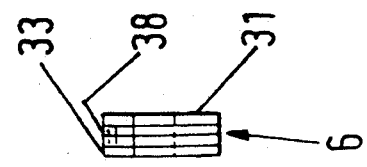

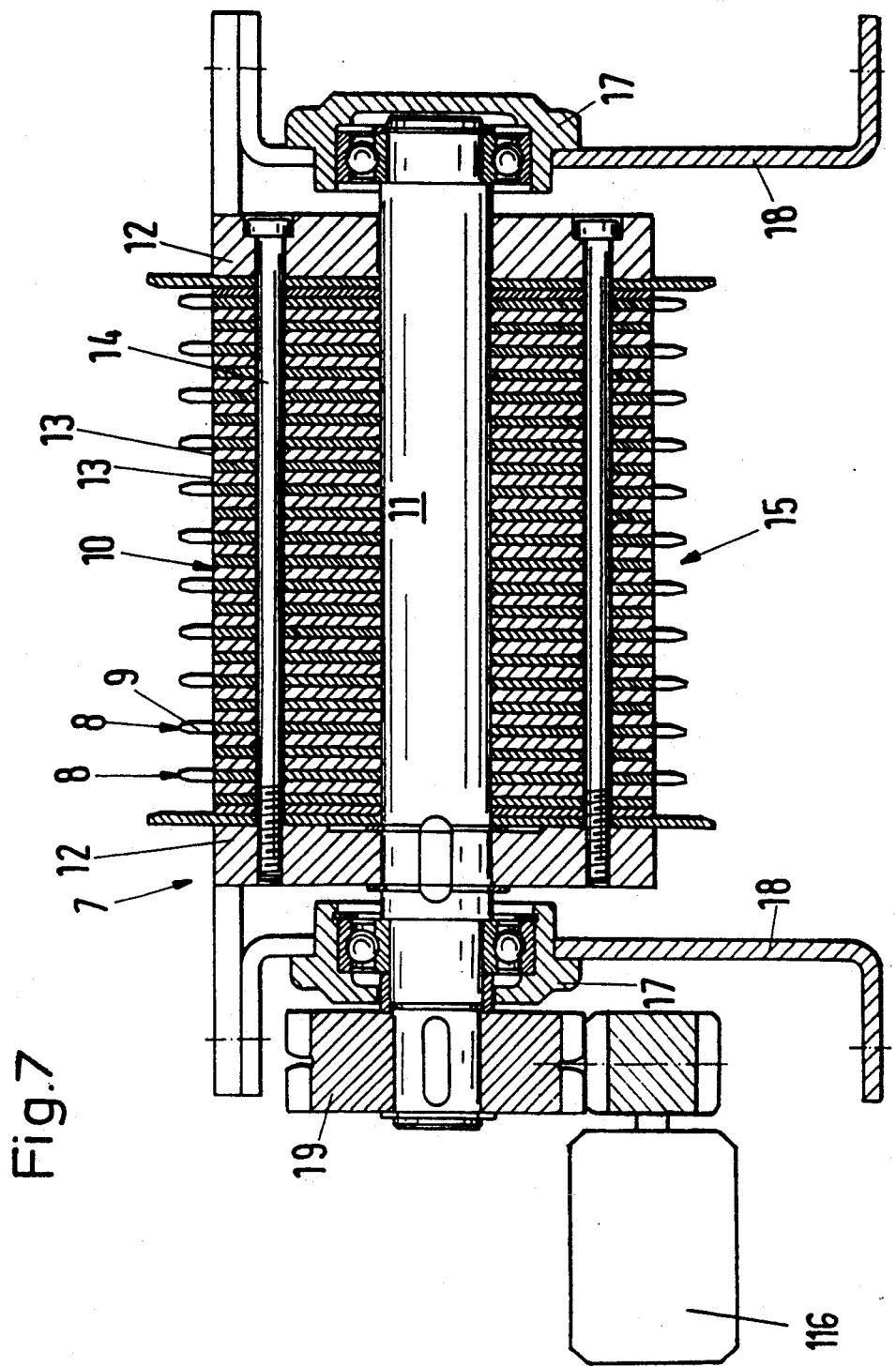

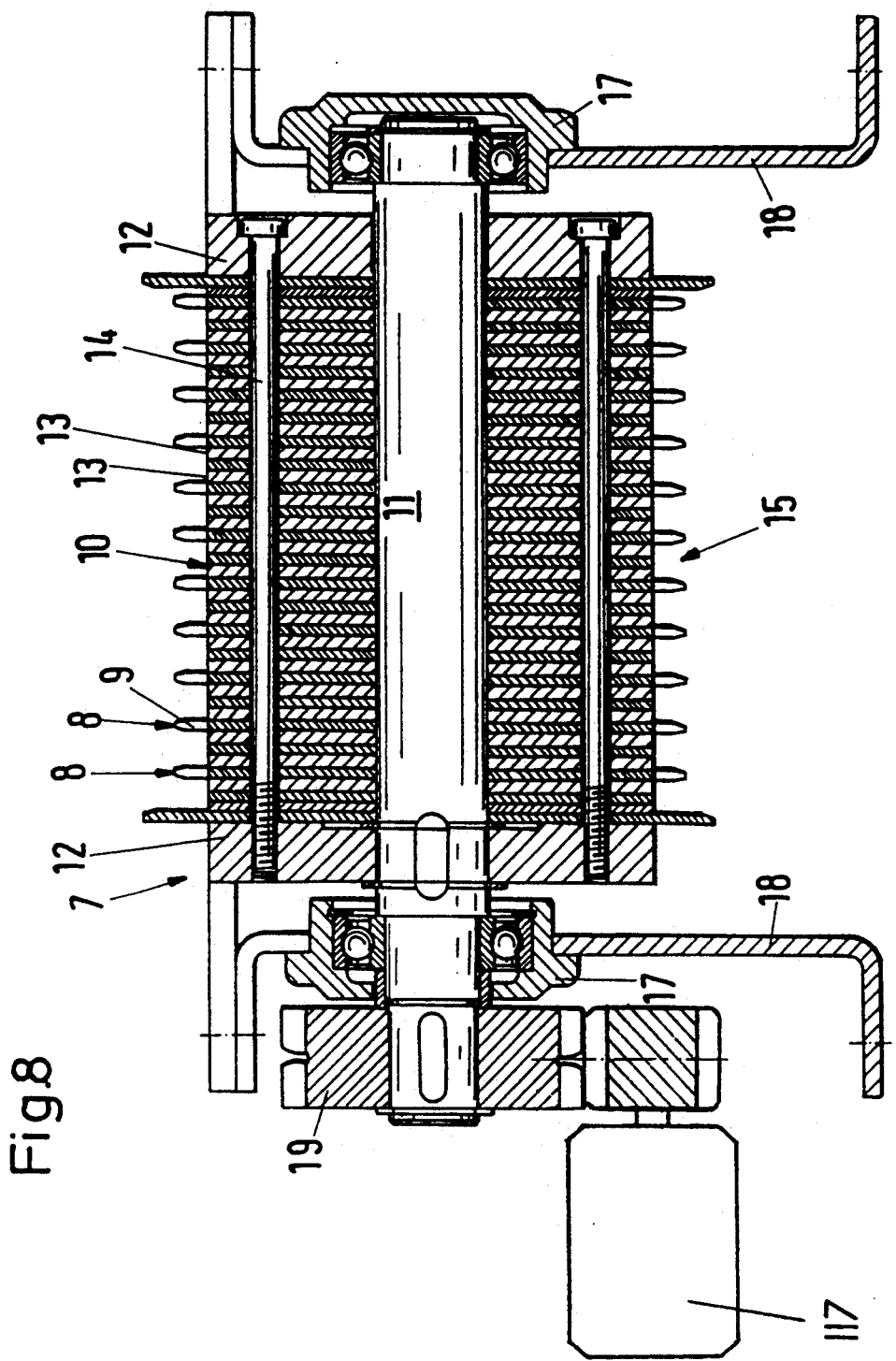

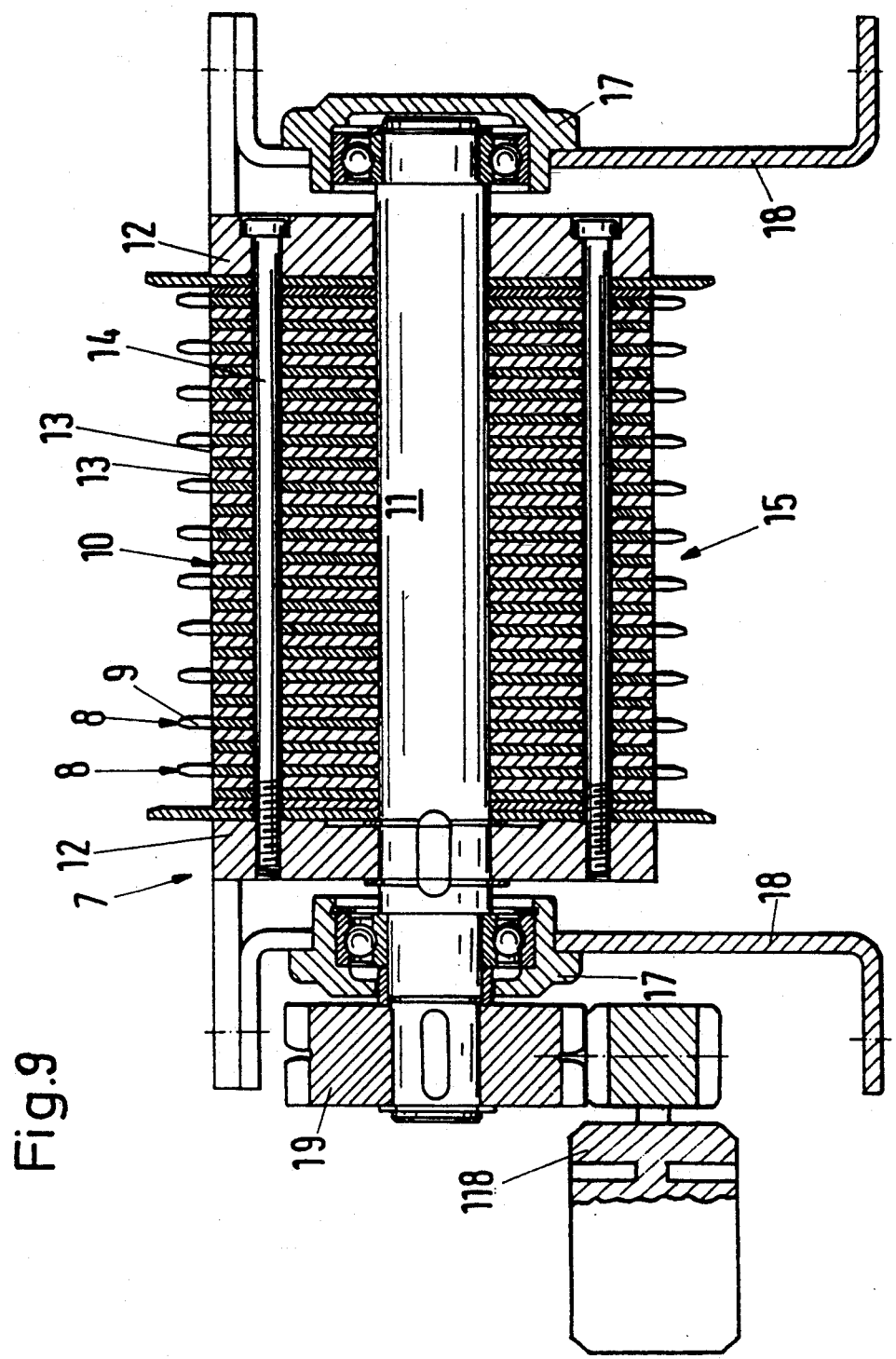

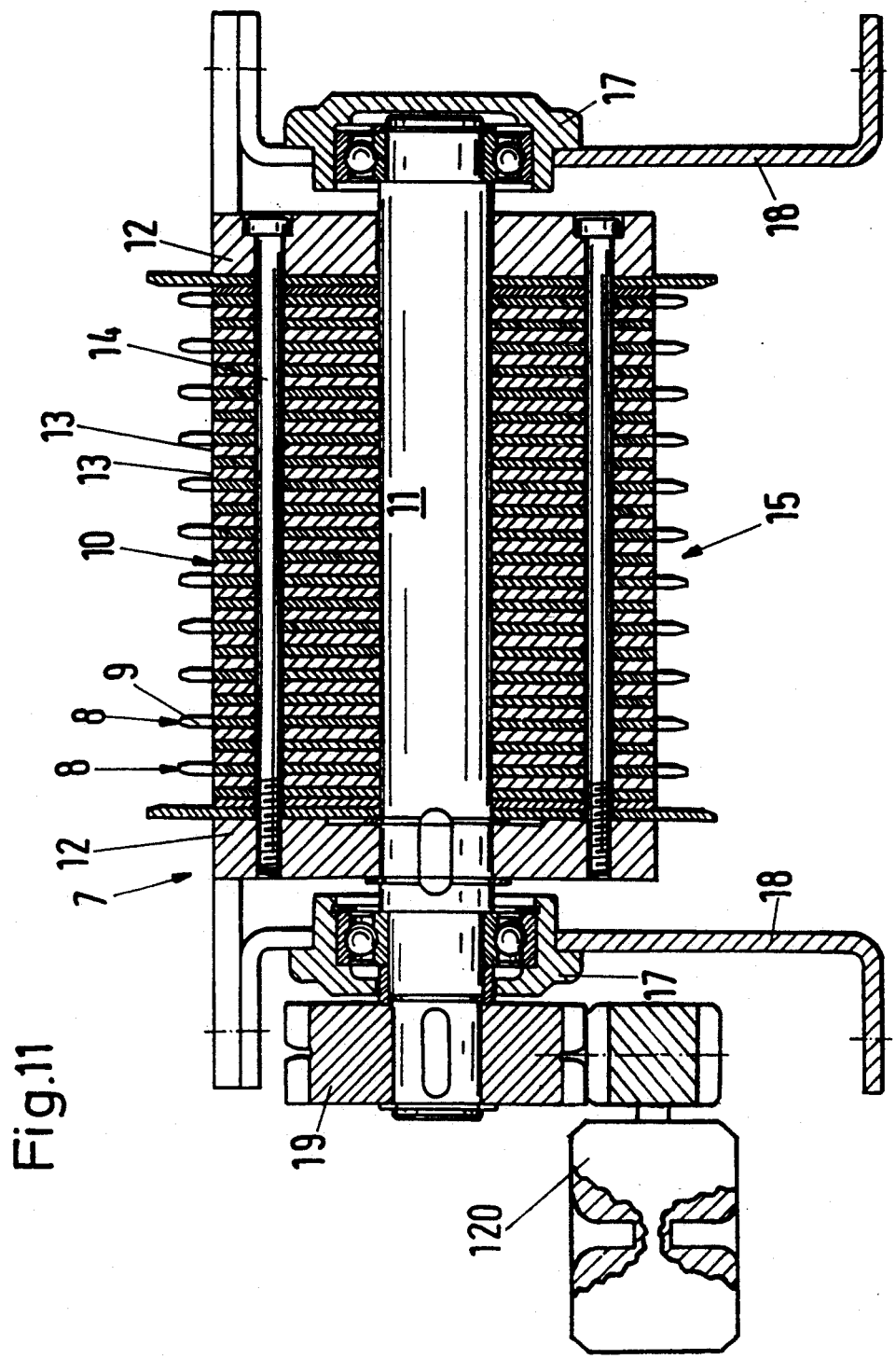

TRANSPORT GEAR CHAIN ARRANGEMENT

BACKGROUND OF THE INVENTION

1. Field of the Invention

The invention relates to a transport gear chain arrangement, in particular for the transport of glass articles and glass goods, with at least two gear chain sections, disposed in series in transport direction, wherein the gear chain sections in each case comprise two transport gear chains surrounding two sprocket wheels, which transport gear chains are led on a chain sliding path, wherein at least one sprocket wheel is driven in each gear chain section.

2. Brief Description of the Background of the Invention Including Prior Art

Such transport gear chains are employed in the glass industry as machine conveyor or feed conveyor, as annealing furnace crossover conveyor and annealing lehr cooling unit at the cold end of the testing stations. The transport of parts includes, for example, hollow glass bodies between a molding machine and an annealing furnace of a glass works or a glass factory. The articles to be transported are placed at the beginning of a transport path at uniform distance onto the transport gear chain such that no change of the set distance between the articles to be transported occurs until the goal point is reached under constant speed operation.

In contrast, it is an object in the hollow glass body transport to move the articles to be transported in front of an annealing lehr or cooling unit, having a smaller distance than the distance corresponding to the initially set distance of the articles. In other cases, it is desired that the distance of the articles to be transported is reduced or is increased again. Such a mode of operation requires a speed change of the conveyed articles occurring in certain sections of the transport path.

It has been proposed in the German printed patent document (DE-A-24 31 668) to employ a chain link with a varying length for application areas such as, for example, mechanical side walks. At the locations where the person steps onto the side walk, the speed of an endless chain is lower and subsequently the chain has to be accelerated again. A slowing down of the chain motion is utilized by way of connection rods made of one or more flexible connection members in the case of the known link chain with varying length. However, because of the extreme operating conditions in glass factories, no use should be made of such connection rods having flexible connection members

SUMMARY OF THE INVENTION

1. Purposes of the Invention

It is an object of the present invention to furnish a transport chain arrangement for high stability and higher temperatures, which allows to change the distances between neighboring transported articles during the course of operation.

It is another object of the present invention to provide a transport conveyor for annealing lehrs which allows to reduce the transport speed of articles placed on the gear chain, where such speed reduction leads to a closer spacing between neighboring articles to be conveyed It is yet a further object of the present invention to provide a transport chain arrangement which allows to adapt the conveying speed of the transported articles to different values in different sections of the transport chain arrangement.

These and other objects and advantages of the present invention will become evident from the description which follows.

2. Brief Description of the Invention

According to the present invention, there is provided for a transport gear chain arrangement. A first transport gear chain is furnished at a first gear chain section for transporting articles. A second gear chain section is disposed following to the first gear chain section as seen in transport advance direction. A second transport gear chain is furnished at the second gear chain section. A first common sprocket wheel has teeth for engaging the first transport gear chain with the teeth disposed on the first common sprocket wheel and has a cylindrical section disposed adjacent to the teeth for slidingly guiding the second transport gear chain. Means for driving the first transport gear chain are connected to the first transport gear chain by the first common sprocket wheel for driving the first gear chain section at a first speed. Means for driving the second transport gear chain are mechanically connected to the second transport gear chain for driving the second gear chain section at a second speed.

The means for driving the first gear chain and the means for driving the second gear chain can be driven with differently set or differently settable speeds for the purpose of decreasing or increasing the distances of the articles transported relative to each other in a neighboring area of the first gear chain section and of the second gear chain section.

The teeth of the first common sprocket wheel can be formed on two sprocket wheel disks of the first common sprocket wheel. The cylindrical section can be disposed between the two sprocket wheel disks of the first common sprocket wheel.

A first chain sliding track can guide the first transport gear chain and a second chain sliding track can guide the second transport gear chain. The first transport gear chain and the second transport gear chain can loop the first common sprocket wheel.

A third gear chain section can be disposed following to the second gear chain section as seen in transport advance direction. A third transport gear chain can be furnished at the third gear chain section. Preferably, a second common sprocket wheel has teeth for engaging the second transport gear chain with the teeth disposed on the second common sprocket wheel and has a cylindrical section disposed adjacent to the teeth for slidingly guiding the third transport gear chain. The means for driving the second transport gear chain can be connected to the second transport gear chain by the second common sprocket wheel for driving the second gear chain section at a second speed.

Glass articles can be disposed on the first gear chain section and on the second gear chain section.

The first common sprocket wheel can be formed out of two sprocket wheel disks having the teeth. The cylindrical section can be formed by a spacer plate disposed on the two sprocket wheel disks.

The first common sprocket wheel can be formed out of a plurality of sprocket wheel disks having the teeth. A plurality of cylindrical sections can be formed by respective spacer plates alternatingly disposed between two of the sprocket wheel disks. Tension bolts, distributed over the circumferential rim of the first common sprocket wheel, can connect the sprocket wheel disks and the spacer plates to each other with two end plates, forming axial ends of the first common sprocket wheel, thereby forming a package. A drive shaft can support the package and can be connected to the means for driving the first transport gear chain. The package can be disposed fixed against rotation on the drive shaft.

The first transport gear chain and the second transport gear chain can comprise first U-shaped or bow-shaped outer plates and second flat inner gear plates. The second inner gear plates can be connected with the first outer plates by round bolts having flat heads. The round bolts can be fixed at front faces of the first outer plates with a welding seam produced by a laser welding process.

A first chain tensioning device can be furnished for the first transport gear chain for the first gear chain section and a second chain tensioning device can be furnished for the second transport gear chain for the second gear chain section.

A first sliding bed can be disposed on a first sliding track. First guide devices for constraining a straight course of the first transport gear chain can be disposed on the first sliding bed. The first transport gear chain can include two first transport gear chain members. The first guide devices can be disposed between the two first transport gear chain members.

A gear can be disposed between the means for driving the first gear chain and the first common sprocket wheel for influencing the drive speed by a setting of a gear ratio of the gear. The means for driving the first transport gear chain can be furnished by a member selected from the group consisting of a back gear motor, a bevel wheel motor, a bevel wheel drive, a bevel gear. The member can employ a throughout connected drive shaft or coupled back gear shafts.

Two gear chain sections are disposed successively to each other when viewed in transport forward direction. These gear chain sections can in each case be driven at differently set or settable speeds for the purpose of decreasing or increasing the distances between the neighboring articles to be transported in the adjoining gear chain section. A first transport gear chain of the first gear chain section is slidingly guided on the sprocket wheel tooth structure, and a second transport gear chain of the other second gear chain section is slidingly guided on cylindrical sections disposed between the individual sprocket wheels, with the first transport gear chain and the second transport gear chain disposed on one common sprocket wheel. Such a structure can be driven with transport gear chains having a stable position for the articles to be moved. In case the two gear chain sections are operated at differing speeds, then the distances between neighboring transported articles placed on the conveying means change depending on how the gear chain sections are driven. It is possible in this context to drive the front or forward gear chain section faster than the successively following gear chain section, which results in an increase of a separation distance of the positions of neighboring transported articles on the conveying means. In contrast, driving the front or forward gear chain section slower than the successively following gear chain section will result in a sliding together of neighboring transport articles on the respective front transport gear chain.

The formation of the common sprocket wheel is performed such that the partially toothed sprocket wheel is formed out of sprocket wheel disks and of intermediately disposed spacer disks resulting in an alternating sequence of sprocket wheel disks and spacer disks between end plates. The spacer disks and the sprocket wheel disks are connected to each other by tension bolts, distributed over the circumference, for forming a package. The package is disposed fixed against rotation on a drive shaft of a drive. Therefore, the drive energy fed to the common sprocket wheel is transmitted substantially to the sprocket wheel disks.

A construction deviating from other gear chains is therefore necessary for the transport gear chain structure, which is formed as follows: The transport gear chains in each case comprise first bow-shaped or U-shaped, outer plates and second flat, inner gear plates. The second inner gear plates are connected to the first outer plates by flush-ending round bolts. The front faces of the round bolts are fixed to the first outer face plates by a laser welding. Such chains provide and guarantee a smooth outer face and therefore they are suitable for the spaces between the sprocket wheel disks.

According to further features of the invention, a separate chain tensioning device is furnished for each individual transport gear chain for each gear chain section.

The guiding of the gear chain system is more favorable in that guiding devices are placed on the chain sliding path for providing a straight course on a sliding bed and these guiding devices are disposed between the individual transport gear chains.

The speed differences of two gear chain sections can be generated in a multitude of ways. It is particularly advantageous where the drive for the sprocket wheels in each case is furnished by back gear motors, drive motors, geared engines, by bevel gearings, by wheel transmissions, with throughout connected drive shafts, or by coupled back gear shafts or countershafts, where the drive speed can be influenced through the gear ratio.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 3 is an axial, in part cross-sectional view through a sprocket wheel serving jointly for two gear chain sections;

FIG. 4 is a side elevational view of the transport gear chain to be employed;

FIG. 5 is top plan view onto the embodiment of FIG. 4; and

FIG. 6 is a front elevational view of the transport gear chain of FIG. 4.

FIG. 7 is an axial, in part cross-sectional view through a sprocket wheel serving jointly for two gear chain sections, including a back gear motor;

FIG. 8 is an axial, in part cross-sectional view through a sprocket wheel serving jointly for two gear chain sections, including a bevel wheel motor;

FIG. 9 is an axial, in part cross-sectional view through a sprocket wheel serving jointly for two gear chain sections, including a bevel wheel drive;

FIG. 11 is an axial, in part cross-sectional view through a sprocket wheel serving jointly for two gear chain sections, including coupled back gear shafts.

DESCRIPTION OF INVENTION AND PREFERRED EMBODIMENT

Figure 1:
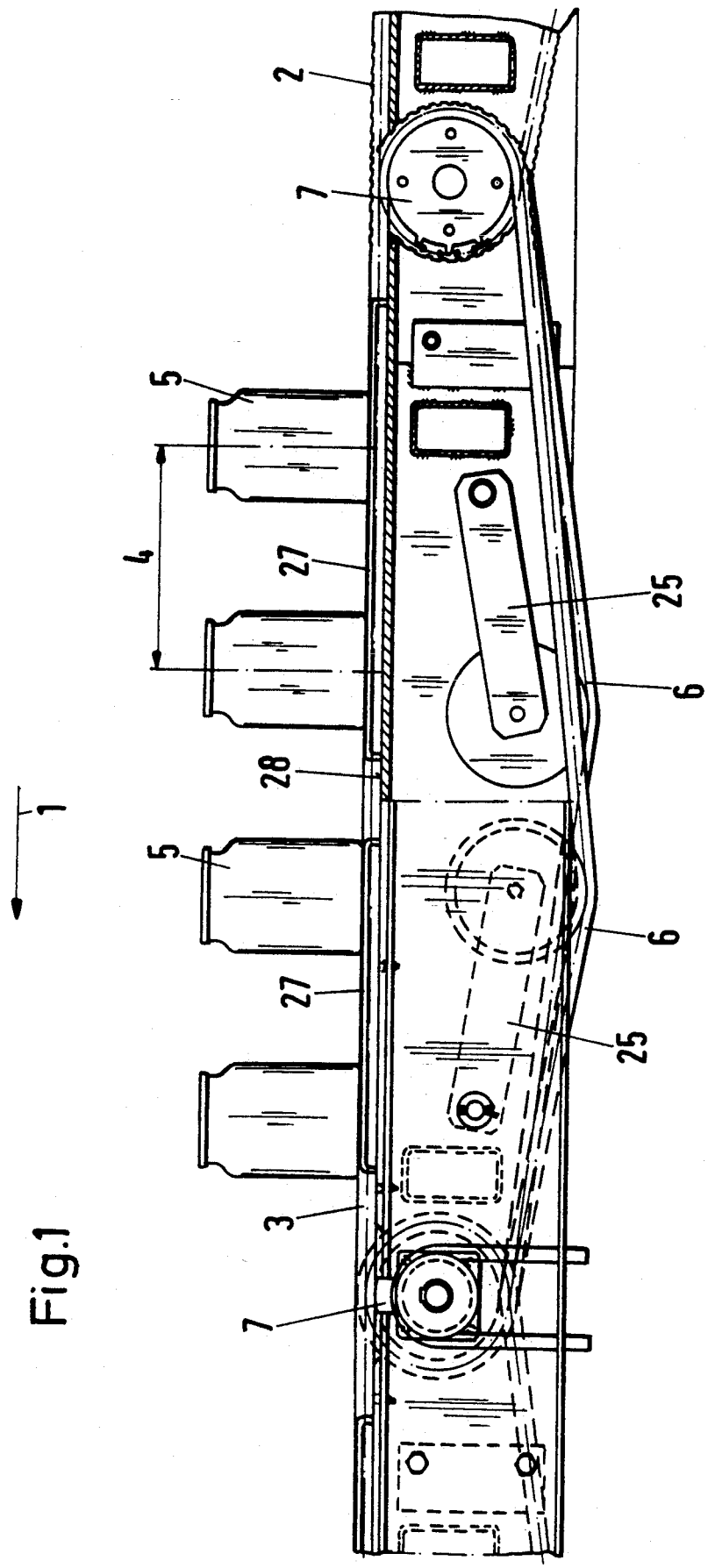
FIG. 1 shows a side elevational view of two gear chain sections following successively as seen in transport direction.

According to the present invention, there is provided for a transport gear chain arrangement, in particular for the transport of glass articles, with at least two gear chain sections, disposed successively as seen in transport advance direction. The gear chain sections in each case comprise transport gear chains looping two sprocket wheels. The transport gear chains are guided on a chain sliding track. At least one sprocket wheel is driven in each gear chain section. In each case two gear chain sections 2, 3, following to each other as seen in transport advance direction 1, are drivable with differently set or differently settable speeds for the purpose of decreasing or increasing the distances 4 of the transported articles relative to each other in the neighboring gear chain section 2; 3. A first transport gear chain 6 of a first gear chain section 2; 3 is engaged by sprocket wheel teeth 8 disposed on the sprocket wheel disks 9 of the common sprocket wheel 7. A second transport gear chain 6 of a second gear chain section 2; 3 is slidingly guided on cylindrical sections 10 disposed between individual sprocket wheel disks 9 of the common sprocket wheel 7.

The partially toothed sprocket wheel 7 can be formed out of sprocket wheel disks 9 and spacer plates 13, disposed alternatingly between end plates 12. The sprocket wheel disks 9 and the spacer plates 13 can be connected to each other with tension bolts 14 distributed over the circumference of the common sprocket wheel 7 thereby forming a package 15. The package 15 can be disposed fixed against rotation on a drive shaft 11 of a drive 16.

The drive 16 for the sprocket wheels 7 in each case can be furnished by a back gear motor 116, a bevel wheel motor 117, a bevel wheel drive 118, a bevel gear 119 with throughout connected drive shafts 120 or by coupled back gear shafts. The drive speed can be influenced by the gear ratio.

The transport gear chains 6 can in each case comprise first bow-shaped or U-shaped outer plates 20 and second flat inner gear plates 21. The second inner gear plates 21 can be connected with the first outer plates 20 by round bolts 22 having flat heads. The round bolts 22 can be fixed at the front faces 23 of the first outer plates 20 with a welding seam produced by a laser welding process. A separate chain tensioning device 25 can be furnished for each individual transport gear chain 6 for each gear chain section 2; 3.

Guide devices 27 for a straight course of the transport gear chain 6 can be disposed on a sliding bed 28 between the individual transport gear chains 6 on a chain sliding track 26.

A transport gear chain installation, in particular for the transport of glass articles, includes at least two gear chain sections, disposed successively as seen in transport advance direction. The gear chain sections in each case comprise transport gear chains looping two sprocket wheels. The transport gear chains are guided on a chain sliding track. At least one sprocket wheel is driven in each gear chain section. In each case two gear chain sections 2, 3, following to each other as seen in transport advance direction 1, are drivable with differently set or differently settable speeds for the purpose of decreasing or increasing distances 4 of the transported articles from each other on the neighboring gear chain section 2; 3. The transport gear chain 6 of the one gear chain section 2; 3 is slidingly guided on a common sprocket wheel 7 on sprocket wheel teeth 8. The transport gear chain 6 of the other gear chain section 2; 3 is slidingly guided on cylindrical sections 10 disposed between individual sprocket wheel disks 9 of the common sprocket wheel 7.

Figure 2:
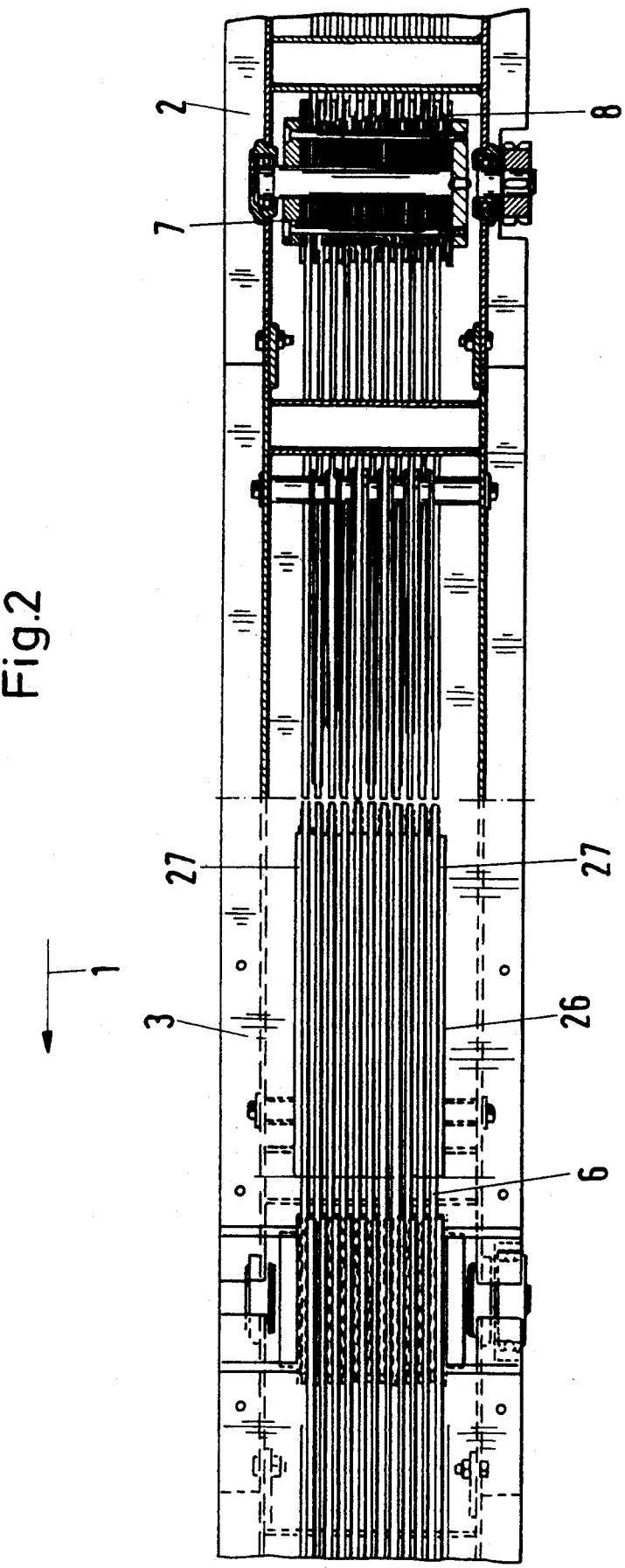
FIG. 2 is a top plan view onto the embodiment of FIG. 1.
Figure 10:
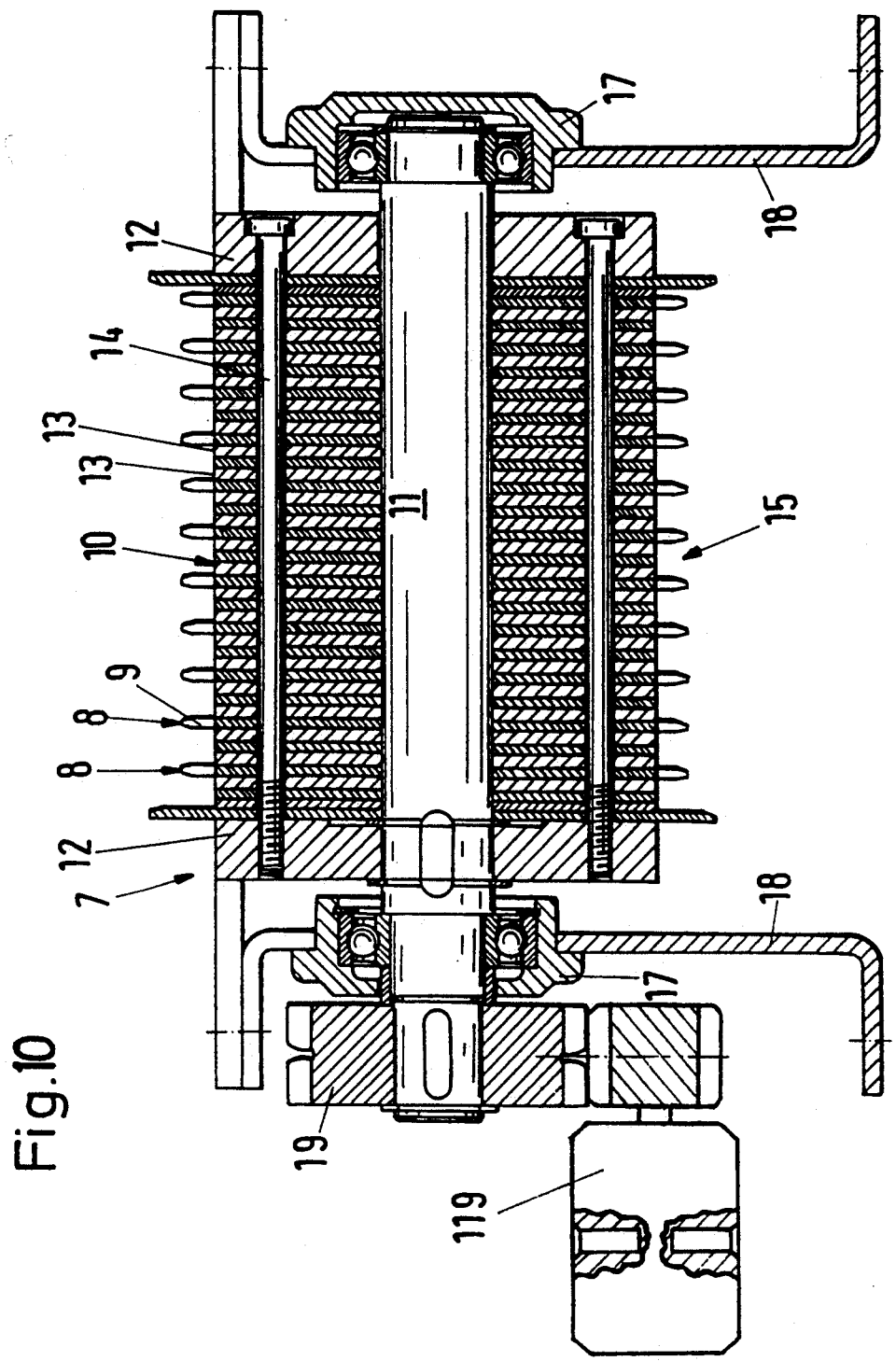
FIG. 10 is an axial, in part cross-sectional view through a sprocket wheel serving jointly for two gear chain sections, including a bevel gear.

The transport gear chain arrangement according to FIGS. 1 and 2 is suitable in particular for glass articles, such as for example hollow glass bodies, but it is also suitable for any other material to be transported. Two gear chain sections 2 and 3 are disposed successively as seen in transport direction 1. Each of the gear chain sections 2 and 3 are driven with different speeds in order to effect a change of a distance 4 between the articles 5 to be transported. The distances between the centers of gravity of the articles are substantially proportional to the speed of the gear chain section 2 carrying the article 5.

The transport gear chain 6 of the two gear chain sections 2 and 3 run on a common sprocket wheel 7 for this purpose. This running course is made possible by an engagement of a transport gear chain 6 with sprocket wheel teeth of the sprocket wheel 7 and of another transport gear chain 6, as illustrated in FIG. 3. Cylindrical sections 10 are furnished between the individual sprocket wheel disks 9, where the respective transport gear chain 6 of the respectively other gear chain section 2 or, respectively, 3 is slidingly guided. The sprocket wheel disks 9 are centered on a center drive shaft 11, and the sprocket wheel disks 9 and several intermediately disposed spacer plates 13 are alternatingly disposed between end plates 12 closing the sides on the drive shaft 11. The end plates 12, the sprocket wheel disks 9, and the spacer plates 13 are solidly connected to a package 15 by several tension bolts 14 distributed preferably symmetrically near the circumference of the respective disks or plates. FIG. 3 shows that three spacer plates 13 are disposed in each case between two sprocket wheel disks 9. The drive shaft 11 of the package 15 is driven by a drive 16, which drive 16 will be explained below.

As shown in FIG. 2, neighboring common sprocket wheels 7 are disposed staggered relative to each other such that the position of a sprocket wheel disk 9 of the first common sprocket wheel 7 corresponds to the position of a center of neighboring spacer plates 13 on the second common sprocket wheel and vice versa. This allows that each transport gear chain 6 is driven by the teeth 8 of one common sprocket wheel 7 and slides over the spacer plate or spacer plates of a second common sprocket wheel. Preferably, modular units 40 are provided with one common sprocket wheel 7 and one or two chain tensioning devices such that a connection can be made to like units in the direction of transport gear chain advance and in the reverse direction.

The common sprocket wheel 7 is held and supported in roller bearings 17, and the roller bearings 17 are held and attached in the walls 18 of a frame. A chain wheel 19, is fixed against rotation relative to the drive shaft 11 and is disposed outside on the drive shaft 11, where the chain wheel 19 is connected to the drive 16.

The transport gear chain 6, illustrated in FIGS. 4 through 6, comprises first bow-shaped or U-shaped outer plates 20 and second flat inner gear plates 21. The two plates 20 and 21 are hingedly connected with a round bolt 22 having a flat head, where the round bolt 22 ends flush with the outer surface of a respective one of the first outer plates 20. The round bolts 22 join flush at front faces 23 with the outer surface of the first outer plates 20. The connection of the round bolts 22 to the first outer plates 20 is furnished by laser welding, whereby a flat welding seam 24 is generated.

The transport gear chain 6 further comprises inner plates 21 and outer plates 20, where the inner plates 21 and the outer plates 20 are produced out of a material having the same thickness. The inner plates 21 are flat and in each case two of the inner plates 21, disposed adjacent and in parallel, form the narrow chain links. The inner plates 21 exhibit a tooth 36 in the center of their length directed perpendicular to the chain advance direction. In contrast, the outer plates 20 are connected by way of webs 38, as illustrated in FIGS. 4 and 5, which webs 38 connect the two sides 31, 33 and which webs 38 have the same distance to the individual teeth 36 of the neighboring inner plates 21 based on subdivisions. The recited webs 38 form the chain upper side as seen in the front elevational view of FIG. 6. Considered by itself, the outer plate 20 represents therefore a U standing on the arms, as seen in transport direction 1.

The inner plates 21 exhibit the tooth 36 directed toward the articles to be carried. The tooth 36 is disposed symmetrically between the position of two neighboring bolts 22. The outer plates are each furnished with two teeth 30, 32. The distance of the teeth 36, 30, 32 from each other relative to their respective centers is one third of the distance between next nearest round bolts 22.

The distance of two round bolts 22 coordinated to an outer plate from each other can be from about 1 to 1.2 times the distance of two round bolts 22 coordinated to an inner plate from each other. The distance of two next nearest neighboring, round bolts from each other can be from about 1.8 to 3 times, and preferably 2 to 2.5 times, the extension of the transport gear chain 6 in a direction perpendicular to the axis of the bolts 22 and perpendicular to the transport gear chain advance direction.

Each of these transport gear chains 6 exhibits a separate chain tensioning device 25, as illustrated in FIG. 1. The transport gear chains 6 are further guided on a chain sliding track 26, where guide devices 27 are disposed for this purpose at the level of a sliding bed 28 between the individual transport gear chains 6, as illustrated in FIG. 2. The drive 16, illustrated in FIG. 3, for the sprocket wheels 7 is furnished by back gear motors, bevel wheels gearings with throughout connected drive shafts or by coupled back gear shafts, not illustrated here in detail.

It will be understood that each of the elements described above, or two or more together, may also find a useful application in other types of transport gear chains arrangements differing from the types described above.

While the invention has been illustrated and described as embodied in the context of a transport gear chain arrangement for the transport of glass articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transport gear chain arrangement comprising
    a first gear chain section for transporting articles;
    a first transport gear chain furnished at the first gear chain section for transporting articles;
    a second gear chain section disposed following to the first gear chain section as seen in transport advance direction;
    a second transport gear chain furnished at the second gear chain section;
    a first common sprocket wheel having teeth for engaging the first transport gear chain with the teeth disposed on the first common sprocket wheel and having a cylindrical section disposed adjacent to the teeth for slidingly guiding the second transport gear chain;
    means for driving the first transport gear chain and connected to the first transport gear chain by the first common sprocket wheel for driving the first gear chain section at a first speed;
    means for driving the second transport gear chain and mechanically connected to the second transport gear chain for driving the second gear chain section at a second speed.

2. The transport gear chain arrangement according to claim 1 wherein the means for driving the first gear chain and the means for driving the second gear chain are drivable with differently set or differently settable speeds for the purpose of decreasing or increasing the distances of the articles transported relative to each other in a neighboring area of the first gear chain section and of the second gear chain section.

3. The transport gear chain arrangement according to claim 1 wherein the teeth of the first common sprocket wheel are formed on two sprocket wheel disks of the first common sprocket wheel, and wherein the cylindrical section is disposed between the two sprocket wheel disks of the first common sprocket wheel.

4. The transport gear chain arrangement according to claim 1 further comprising
    a first chain sliding track guiding the first transport gear chain;
    a second chain sliding track guiding the second transport gear chain; and wherein the first transport gear chain and the second transport gear chain loop the first common sprocket wheel.

5. The transport gear chain arrangement according to claim 1 further comprising
    a third gear chain section disposed following to the second gear chain section as seen in transport advance direction;
    a third transport gear chain furnished at the third gear chain section;
    a second common sprocket wheel having teeth for engaging the second transport gear chain with the teeth disposed on the second common sprocket wheel and having a cylindrical section disposed adjacent to the teeth for slidingly guiding the third transport gear chain, and wherein the means for driving the second transport gear chain is connected to the second transport gear chain by the second common sprocket wheel for driving the second gear chain section at a second speed.

6. The transport gear chain arrangement according to claim 1 further comprising
glass articles disposed on the first gear chain section and on the second gear chain section.

7. The transport gear chain arrangement according to claim 1, wherein the first common sprocket wheel is formed out of two sprocket wheel disks having the teeth and wherein the cylindrical section is formed by a spacer plate disposed on the two sprocket wheel disks.

8. The transport gear chain arrangement according to claim 1, wherein the first common sprocket wheel is formed out of a plurality of sprocket wheel disks having the teeth, and wherein a plurality of cylindrical sections is formed by respective spacer plates alternatingly disposed between two of the sprocket wheel disks; and further comprising
two end plates;
tension bolts distributed over a circumferential rim of the first common sprocket wheel and connecting the sprocket wheel disks and the spacer plates to each other with the end plates forming axial ends of the first common sprocket wheel and thereby forming a package;
a drive shaft supporting the package and connected to the means for driving the first transport gear chain, wherein the package is disposed fixed against rotation on the drive shaft.

9. The transport gear chain arrangement according to claim 1, wherein the first transport gear chain and the second transport gear chain comprise first U-shaped outer plates and second flat inner gear plates, wherein the second inner gear plates are connected with the first outer plates by round bolts having flat heads, and wherein the round bolts are fixed at front faces of the first outer plates with a welding seam produced by a laser welding process.

10. The transport gear chain arrangement according to claim 1, wherein the first transport gear chain and the second transport gear chain comprise first bow-shaped outer plates and second flat inner gear plates, wherein the second inner gear plates are connected with the first outer plates by round bolts having flat heads, and wherein the round bolts are fixed at front faces of the first outer plates with a welding seam produced by a laser welding process.

11. The transport gear chain arrangement according to claim 1 further comprising
a first chain tensioning device furnished for the first transport gear chain for the first gear chain section;
a second chain tensioning device furnished for the second transport gear chain for the second gear chain section.

12. The transport gear chain arrangement according to claim 1 further comprising
a first sliding track;
a first sliding bed disposed on the first sliding track;
first guide devices for constraining a straight course of the first transport gear chain disposed on the first sliding bed, wherein the first transport gear chain includes two first transport gear chain members, and wherein the first guide devices are disposed between the two first transport gear chain members.

13. The transport gear chain arrangement according to claim 2 further comprising
a gear disposed between the means for driving the first gear chain and the first common sprocket wheel for influencing the drive speed by a setting of a gear ratio of the gear; and
wherein the means for driving the first transport gear chain is furnished by a member selected from the group consisting of a back gear motor, a bevel wheel motor, a bevel wheel drive, a bevel gear, wherein the member employs a throughout connected drive shaft.

14. A transport gear chain arrangement, in particular for the transport of glass articles, with at least two gear chain sections, disposed successively as seen in transport advance direction, where the gear chain sections in each case comprise transport gear chains looping two sprocket wheels, where the transport gear chains are guided on a chain sliding track, wherein at least one sprocket wheel is driven in each gear chain section, wherein in each case two gear chain sections (2, 3), following to each other as seen in transport advance direction (1), are drivable with differently set or differently settable speeds for the purpose of decreasing or increasing the distances (4) of the transported articles relative to each other in the neighboring gear chain section (2; 3), wherein a first transport gear chain (6) of a first gear chain section (2; 3) is engaged by sprocket wheel teeth (8) disposed on the sprocket wheel disks (9) of a partially toothed common sprocket wheel (7) and wherein a second transport gear chain (6) of a second gear chain section (2; 3) is slidingly guided on cylindrical sections (10) disposed between individual sprocket wheel disks (9) of the common sprocket wheel (7).

15. The transport gear chain arrangement according to claim 14, wherein the partially toothed sprocket wheel (7) is formed out of sprocket wheel disks (9) and spacer plates (13), disposed alternatingly between end plates (12), wherein the sprocket wheel disks (9) and the spacer plates (13) are connected to each other with tension bolts (14) distributed over the circumference of the common sprocket wheel (7) thereby forming a package (15), and wherein the package (15) is disposed fixed against rotation on a drive shaft (11) of a drive (16).

16. The transport gear chain arrangement according to claim 15, wherein the drive (16) for the sprocket wheels (7) in each case is furnished by a back gear motor, a bevel wheel motor, a bevel wheel drive, a bevel gear with throughout connected drive shafts, wherein the drive speed is influenced by the gear ratio.

17. The transport gear chain arrangement according to claim 14, wherein the transport gear chains (6) in each case comprise first bow-shaped or U-shaped outer plates (20) and second flat inner gear plates (21), wherein the second inner gear plates (21) are connected with the first outer plates (20) by round bolts (22) having flat heads, and wherein the round bolts (22) are fixed at the front faces (23) of the first outer plates (20) with a welding seam produced by a laser welding process.

18. The transport gear chain arrangement according to claim 14, wherein a separate chain tensioning device (25) is furnished for each individual transport gear chain (6) for each gear chain section (2; 3).

19. The transport gear chain arrangement according to claim 14, wherein guide devices (27) for a straight course of the transport gear chain (6) are disposed on a sliding bed (28) between the individual transport gear chains (6) on a chain sliding track (26).

20. Transport gear chain installation, in particular for the transport of glass articles, with at least two gear chain sections, disposed successively as seen in transport advance direction, where the gear chain sections in each case comprise transport gear chains looping two sprocket wheels, where the transport gear chains are guided on a chain sliding track, wherein at least one sprocket wheel is driven in each gear chain section, wherein
    in each case two gear chain sections (2, 3), following to each other as seen in transport advance direction (1), are drivable with differently set or differently settable speeds for the purpose of decreasing or increasing distances (4) of the transported articles from each other on the neighboring gear chain section (2; 3), wherein the transport gear chain (6) of the one gear chain section (2; 3) is slidingly guided on a common sprocket wheel (7) on sprocket wheel teeth (8), and wherein the transport gear chain (6) of the other gear chain section (2; 3) is slidingly guided on cylindrical sections (10) disposed between individual sprocket wheel disks (9) of the common sprocket wheel (7).

21. A transport gear chain arrangement according to claim 2 further comprising
    a gear disposed between the means for driving the first gear chain and the first common sprocket wheel for influencing the drive speed by a setting of a gear ratio of the gear; and
    wherein the means for driving the first transport gear chain is furnished by a member selected from the group consisting of a back gear motor, a bevel wheel motor, a bevel wheel drive, a bevel gear, wherein the member employs coupled back gear shafts.

22. The transport gear chain arrangement according to claim 15, wherein the drive (16) for the sprocket wheels (7) in each case is furnished by a back gear motor, a bevel wheel motor, a bevel wheel drive, a bevel gear, coupled back gear shafts, wherein the drive speed is influenced by the gear ratio.

* * * * *